Dec. 3, 1935. T. E. MURRAY Re. 19,781

RADIATOR

Original Filed April 26, 1924 3 Sheets-Sheet 1

INVENTOR
THOMAS E. MURRAY, Dec
American Radiator and Standard Sanitary Corporation, Assignee.
By Wilma & Rauber
ATTORNEYS Dec. 3, 1935. T. E. MURRAY Re. 19,781

RADIATOR

Original Filed April 26, 1924 3 Sheets-Sheet 2

INVENTOR
THOMAS E. MURRAY, Dec.
American Radiator and Standard Sanitary Corporation, Assignee.
By Usina & Rauher
ATTORNEYS Dec. 3, 1935. T. E. MURRAY Re. 19,781

RADIATOR

Original Filed April 26, 1924 3 Sheets-Sheet 3

INVENTOR
THOMAS E. MURRAY, Dec.
American Radiator and Standard Sanitary Corporation, Assignee
By Ulina & Rauber
ATTORNEYS Reissued Dec. 3, 1935 Re. 19,781

UNITED STATES PATENT OFFICE 19,781

RADIATOR

Thomas E. Murray, deceased, late of Brooklyn, N. Y., by American Radiator and Standard Sanitary Corporation, New York, N. Y., a corporation of Delaware, assignee Original No. 1,744,078, dated January 21, 1930, Serial No. 709,080, April 26, 1924. Application for reissue January 15, 1932, Serial No. 586,927

23 Claims. (Cl. 257—139)

This invention relates to improvements in radiators and similar heating apparatus and aims to provide a radiator including a heating element such for example as conduits to which the heating medium is supplied and means for effecting a heat transfer to the surrounding atmosphere over a greatly extended surface.

Embodiments of the invention are illustrated in the accompanying drawings in which—

Figure 3:
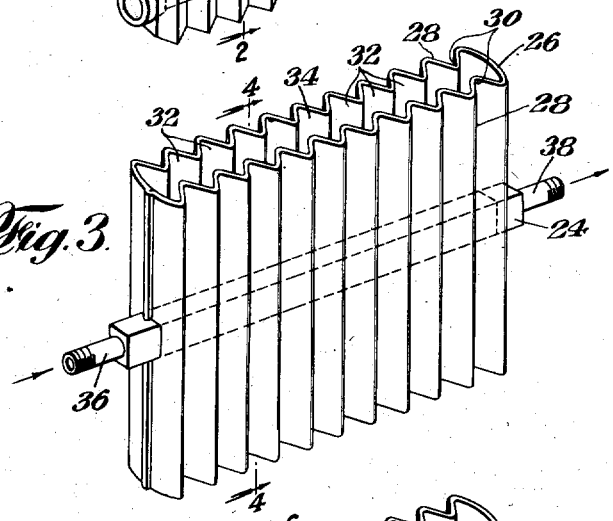
Figure 4:
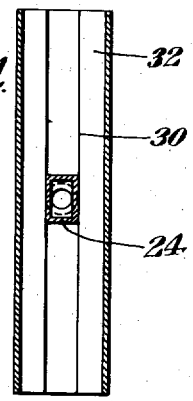
Figure 5:
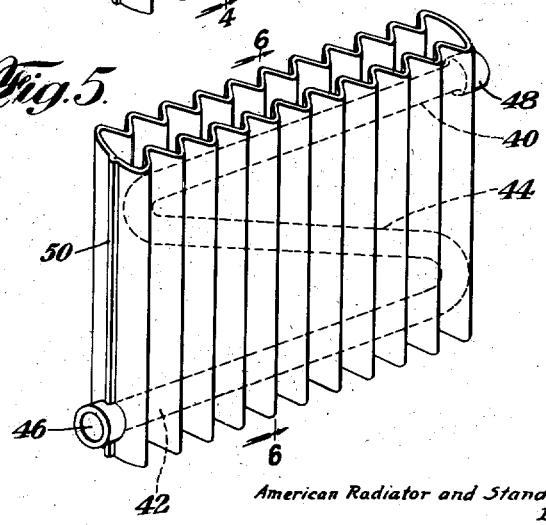
Figure 6:
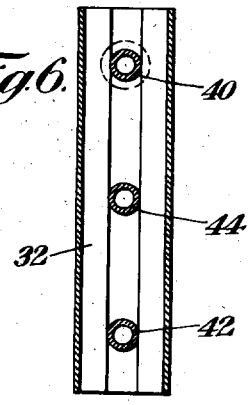

Figs. 3, 4, 5 and 6 represent slightly modified forms of the invention, Figs. 4 and 6 being sections taken on the lines 4—4 and 6—6 of Figs. 3 and 5.

Figure 7:
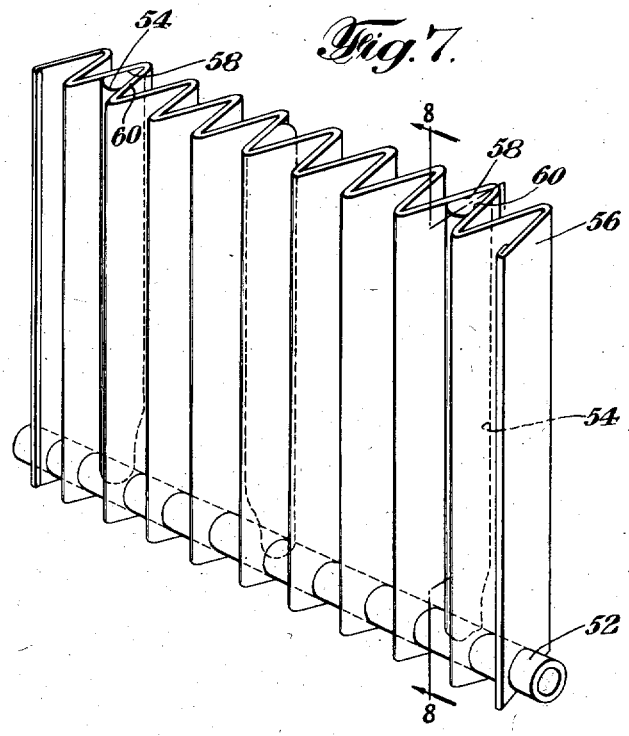
Figure 8:
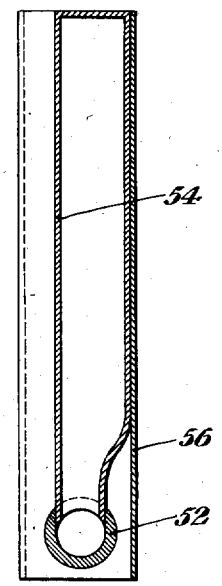

Fig. 7 is a perspective and Fig. 8 is a section on the line 8—8 thereof, of another modification.

Figure 9:
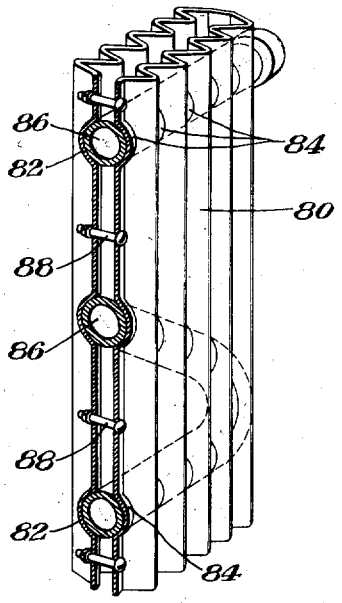
Figure 10:
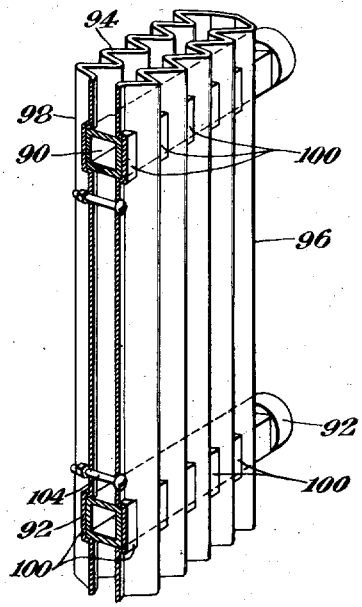
Figure 11:
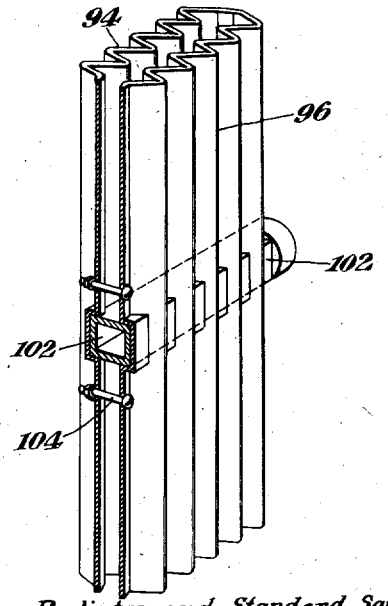

Figs. 9, 10 and 11 are perspectives, with one end in vertical section, of three other modifications.

Figure 1:
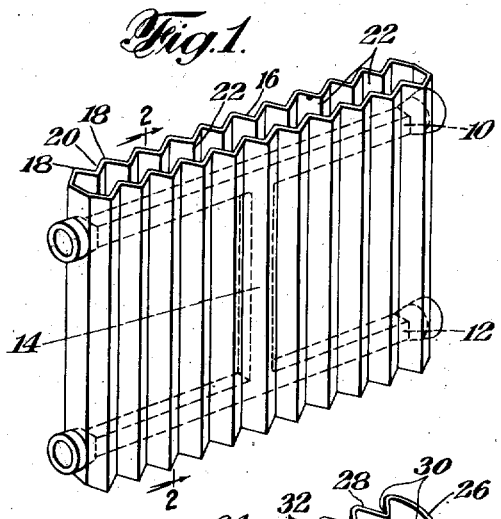
Fig. 1 is a perspective view of one form of radiator.
Figure 2:
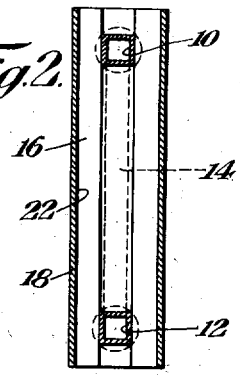
Fig. 2 is a transverse section on line 2—2 of Fig. 1.

Referring first to Figs. 1 and 2, the radiator comprises a pair of spaced conduits 10 and 12 communicating with one another by a branch 14 at the center. A sheet metal shell 16 is secured to the conduits 10 and 12, this shell being formed with a series of ridges 18 and depressions 20 producing a shell of zig-zag contour. The opposite walls of this shell enclose a number of V-shaped spaces or flues 22 through which air from the surrounding atmosphere may freely circulate. The walls of the sheet metal member are united with the walls of the conduits 10 and 12 so that the heat from the heating medium circulated through the conduit is transferred by conduction to the entire surface of the corrugated shell. It is thus apparent that the heat transferring surface of the conduits is greatly extended, hence, the heat from said conduits can be rapidly transferred to the surrounding atmosphere. The conduits 10 and 12 in Figs. 1 and 2 are shown of rectangular or square cross-section and may be of various other shapes in cross-section. This provides flat faces to which the walls of the shell may be secured so as to make a good heat transferring joint. The shell may be soldered, welded, brazed (that is, united by heat and pressure to the outside of the conduit) or secured in various other ways to the walls of the conduit.

In Figs. 3 and 4, is shown a slightly modified form of radiator employing a single rectangular conduit 24 and an outer shell 26 in which the ridges 28 are directly opposite one another as are also the depressed portions 30 which contact with the side walls of the conduit 24. With this arrangement a plurality of flues 32 are formed which communicate with one another through the more or less restricted portions 34. In this figure is shown an inlet pipe 36 for supplying hot water or steam to the conduit 24 and an outlet pipe 38 connected to the opposite end of the conduit.

In Figs. 5 and 6 is illustrated a further modification in which the shell is of substantially the same construction as that shown in Figs. 3 and 4, the heating conduit, however, being formed of a length of bent pipe having an upper arm 40 and a lower arm 42 connected by an intermediate section 44. The ends of the pipe are either upset as shown at 46 and 48 or are provided with suitable fittings for connecting with the pipes of the heating system. The shell as shown in this figure is formed of one continuous sheet of metal which is corrugated and bent, turned around and joined at the seam 50. The shell may be electrically welded or otherwise secured (as described above for Figs. 1 and 2) to the portions 40, 42 and 44 of the pipe.

In Figs. 7 and 8 is illustrated a further modification in which a conduit 52 is provided with perpendicular branches 54 which are hollow as shown in Fig. 8 so as to permit the heating medium to contact with the walls thereof throughout their entire lengths. In this form of the device the extended heat transferring surface is secured by providing a corrugated plate 56 of zig-zag formation, and the walls 58 and 60 of the branches 54 are inclined at a suitable angle to engage the zig-zag walls of the shell.

The joints between the conduits and the plates or fins which provide the extended surface must be of sufficient area to transmit enough heat to satisfy the extended area. These plates are actually bonded by a united metal joint such as welding or soldering in order to form an efficient heat conducting joint.

Figs. 9 to 11 show constructions whereby a generous contact area is secured between the conduits through which the heating medium is circulated and the plates which form extended surfaces.

In Fig. 9 the corrugated plates 78 and 80 are provided with pressed out curved portions 82 and 84 which are shaped to fit the curvature of the pipe or conduit 86 through which the heating medium is circulated and which is a single length of tubing bent back and forth as shown complete in Fig. 5. By providing the curved portions 82 and 84 sufficient area is provided to transmit the amount of heat necessary to satisfy the extended area of the corrugated plates 78 and 80. The corrugated plates are preferably soldered, welded or otherwise secured as described for Figs. 1 and 2 to the pipe or conduit 86 so that a good heat transmitting bond is effected.

To relieve the joint of any strains in use which might tend to separate it from the conduit, I provide bolts 88 which pass through the plates 78 and 80 whereby the latter can be drawn together.

The recesses in the corrugated sheets shown in this figure and in Figs. 10 and 11 not only secure a good area of contact but have advantages in the making of the soldered or similar joint described by embracing the pipe to form a mechanical lock which holds the parts accurately in position during the soldering operation. The recesses are of less depth than that which would entirely surround the pipe and bring the opposite sheets into contact. Such contact between the opposite sheets would interfere with the pressing of the sheets into close engagement with the pipe during the soldering operation. By keeping the sheets slightly apart from each other there is no such interference and the pressure can be exerted to the desired limit and will all be exerted in enforcing a good contact of the sheets with the pipe.

Figs. 10 and 12 show a slightly modified arrangement in which conduits 90 and 92 are squared in cross-section and the corrugated plates 94 and 96 are formed with outwardly pressed bosses 98 and 100 to provide a generous contact area for engagement with the side walls of the square pieces 90 and 92. The arrangement shown in Fig. 11 is substantially the same as that shown in Fig. 10 with the exception that a portion of a radiator is illustrated which is only provided with one conduit 102 through which the heating medium is passed. The conduits 90 and 92 of Fig. 10 may be branches from a common header, in parallel, or may be connected to each other in series or end to end like 40, 44 and 42 of Fig. 5.

In the form shown in both Figs. 10 and 11, bolts 104 are provided to relieve the soldered or welded joints between the plates and the pipe of strains. The plates forming the extended surface can be made of different kinds of metal. It has been determined that sheet copper is a metal which can be very effectively used for the purpose as it conducts heat much more rapidly than other comparatively common metals such as sheet iron or steel. No claim is made herein to such a use of sheet copper, this being covered in application of Thomas E. Murray, Serial No. 725,559 (continued, with certain additions, in application Serial No. 188,890), and Patent No. 1,813,123, granted July 7, 1931.

The invention is referred to as a radiator for a heat conducting element. It will be understood that the apparatus may be applied to other purposes than those of the ordinary radiator for heating air. For example, the heat may be conducted away from the fluid in the conduit for the purpose of cooling the latter; the heating of the medium which passes through the radiating structure being incidental to the main purpose. The radiators may be arranged in either of the two common ways, with the inlet for steam at one end and the outlet for water at the other end or according to the one-pipe system in which the water runs back and out through the steam inlet.

It is important that the steam conduit be made of tubing and preferably in a continuous tube like that of Figs. 5 and 9 without joints. Joints in such a vessel are difficult to maintain tight especially with the use of steam or other high temperature heating medium. Where joints are made in the conduit or vessel, they remain good as long as the temperature is constant. But when subjected a number of times to alternation of high and low temperatures, the joints will not remain tight. The use of a continuous tube without joints makes it possible to use the radiator with steam of the highest temperature and, therefore, to get a large capacity out of a small radiator. Such a tube also resists perfectly the pressure of the steam and avoids difficulties arising from this cause in conduits or vessels of other styles. In this respect the round tube of Fig. 5 is better than the square tube of Fig. 3. By using copper tubing the bending of it to the desired lines is made easier, and also the great conductivity of this metal gives an advantage. The radiating structure, therefore, does not have to be designed so as to reinforce the strength of the conduit, but may be made very light and designed chiefly for appearance and radiating effect.

A point of advantage commercially is in the appearance. Fig. 5, for example, shows that the radiator approximates the appearance of the cast iron or steel radiator now most generally used. Compared with this common radiator, however, that of Fig. 5 will produce three or four times as great a circulation of air through the radiator and consequently throughout the room heated; which means a more nearly uniform temperature throughout. For a given capacity, a radiator of this improved type utilizes only about one-half the floor area of the ordinary cast iron type and weighs about one-seventh as much. It also heats up to its maximum temperature in about one-tenth of the time of the ordinary iron radiator of the same capacity.

The radiator may be equally used for cooling air by circulating cold brine or the like through the pipes so that the latter becomes a heating element only in the negative sense, that is, they extract heat from the radiating structure and induce a flow of the cool air downward through the flues similar to the upward circulation of air induced by the passage of steam through the pipes.

The transverse plates forming the corrugated structure described are prolonged vertically above the horizontal heat conducting tube, particularly the tube 24 of Figs. 3 and 4, the tube 52 of Fig. 7 and the tube 102 of Fig. 11 to a great height relatively to the width of the plates so as to form heated and unimpeded vertical air ducts into the lower ends (and the open sides in the case of Fig. 7).

The cool air passes and rises between the walls of the ducts formed by the plates in the form of a horizontal series of vertical columns of air which are progressively heated on both sides by prolonged contact with the heated walls of the ducts and are thus impelled rapidly upward, so as to accelerate the circulation of the heated air columns upward from the ducts and throughout the room or inclosure to be heated. The transverse plates have a close heat conducting relation to the tube. The heat produced within the tube is, therefore, transmitted through the tube to the extended area of the plates forming the vertical air ducts referred to so that the columns of air ascending are progressively heated by the prolonged contact with the plates at both sides of each column, and the ascent of the air is thus continuously and progressively accelerated. The result is that instead of a relatively stationary or slowly rising and laterally diffusing overheated body of air around the heating element, and underheated air in the remainder of the room or inclosure, the present invention produces a greatly accelerated ascent of warm columns of air through the heated ducts and upward therefrom and thus a forced circulation and distribution of evenly heated air throughout the entire inclosure.

Though the particular embodiments of the invention illustrated have been described with great particularly, it is not to be construed that the invention is limited thereto, as various changes and modifications may be made by those skilled in the art without departing from the invention as defined in the appended claims.

What is claimed is—

1. A radiator comprising a high temperature heating element extending horizontally and an extended surface radiating structure comprising parts located on opposite sides of said heating element, bolted to each other at points beyond the heating element and forming a number of vertical flues closed at the sides and extending beyond the heating element to induce a rapid draft of the heated air.

2. An extended area radiator for steam or other high temperature heating medium comprising in combination a continuous jointless tube in a plurality of sections extending back and forth lengthwise of the radiator and a radiating structure applied to the sides thereof and corrugated in horizontal section and connected to the outside of the tube with a good heat conducting contact so as to conduct heat away therefrom rapidly.

3. A radiator including in combination a heating element, a separately formed radiating structure of sheet metal having portions bearing against the opposite sides of the heating element and fastening members engaging the outer faces of said portions of the radiating structure and connected to each other by means passing through the radiating structure to hold the latter in close contact with the heating element.

4. A radiator including in combination a heating element, a separately formed radiating structure of corrugated sheet metal having the inner portions of the corrugations bearing against the opposite sides of the heating element and fastening members engaging the outer faces of said portions of the radiating structure and connected to each other to hold the radiating structure in close contact with the heating element.

5. An extended area radiator for heating and circulating the air of a room, comprising a conduit for the steam or other heating medium extending in a substantially horizontal direction and a radiating structure secured to said conduit and providing air flues extending in a substantially vertical direction and closed at the sides so as to induce a strong vertical draft of the heated air, said conduit being in a plurality of lengths located one above another.

6. A radiator for heating and circulating the air of a room, comprising a high temperature heating element, said heating element extending in a substantially horizontal direction, and a radiating structure secured to said heating element and providing air flues extending in a substantially vertical direction and closed at the sides, said radiating structure and flues extending to a substantial height above said heating element, so as to induce a strong vertical draft of the heated air.

7. An extended area radiator for steam or other high temperature heating medium for heating and circulating the air in a room, said radiator comprising in combination a continuous jointless tube bent into a plurality of portions extending back and forth lengthwise of the radiator and a radiating structure applied to the sides thereof and corrugated in horizontal section, the radiating structure being connected to the outside of the tube with a good heat conducting contact so as to conduct heat away therefrom rapidly, and the corrugations forming vertical ducts for inducing an upward draft of the heated air.

8. A radiator for heating and circulating the air of a room, comprising a high temperature heating element extending horizontally and an extended surface radiating structure secured thereto and shaped to form vertical flues closed at the sides and extending beyond the heating element a substantial distance, greater than the vertical dimension of the heating element, so as to induce a strong draft of the heated air.

9. A radiator for heating and circulating the air of a room, comprising a high temperature heating element extending horizontally and an extended surface radiating structure secured thereto comprising a separate sheet of metal corrugated in horizontal section engaging the heating element at the inner angles of the corrugations to provide a plurality of vertical flues closed at the sides and extending beyond the heating element a substantial distance, greater than the vertical dimensions of the heating element, to induce a strong draft of the heated air.

10. A radiator for heating and circulating the air of a room including in combination a horizontally extending heating element comparatively small in cross-section and an extended-area structure applied thereto; said structure comprising corrugated plates at opposite sides forming a series of vertical ducts for the circulation of air, the inner portions of the corrugations being shaped to fit the contour of the heating element so as to provide a considerable contact surface for transmission of heat to the extended area and to the air passing through said ducts and to induce a strong upward draft of the heated air, and said inner portions of the opposite plates being secured to each other at points which are remote from their edges but outside of their engagement with the heating element.

11. A radiator for heating and circulating the air of a room including in combination a horizontally extending heating element comparatively small in cross-section and an extended-area structure applied thereto; said structure comprising corrugated plates at opposite sides forming a series of vertical ducts for the circulation of air, the alternate spaces formed by the corrugations being open at the outside to permit access to the said inner portions and the inner portions of the opposite plates being secured to each other at points remote from their edges but outside of their engagement with the heating element.

12. A radiator for heating and circulating the air of a room including in combination a horizontally extending heating element of comparatively small cross section and an extended-area structure engaging the side thereof and forming a series of air ducts extending vertically beyond said heating element a substantial distance, greater than the vertical dimension of the heating element so as to induce an upward draft of the heated air.

13. A heater for heating and circulating the air of a room, including in combination a horizontally extended heating element and an extended area structure engaging the same and comprising a longitudinal series of transverse heat conducting plates fixed to the heating element in heat conducting relation thereto, said plates being substantially free of intervening obstructions and having a height relatively great compared to their width and forming a longitudinal series of unimpeded heated vertical air ducts extending beyond the heating element a substantial distance, greater than the vertical dimension of the heating element, so as to induce an upward draft of the heated air.

14. A heater for heating and circulating the air of a room, comprising a substantially horizontal heating element and a longitudinal series of transverse plates fixed to said heating element in heat conducting relation thereto, said plates being substantially free of intervening obstructions and rising vertically from the heating element to a height relatively great compared to their width, and forming a longitudinal series of unimpeded heated vertical air ducts extending beyond the heating element a substantial distance, greater than the vertical dimension of the heating element, so as to induce an upward draft of the heated air.

15. A heater for heating and circulating the air of a room, comprising in combination a substantially horizontal tube for the heating medium and a horizontal series of transverse plates in heat conducting relation thereto, said plates being substantially free of intervening obstructions and rising vertically from the tube to a height relatively great compared to their width and forming a longitudinal series of unimpeded heated vertical air ducts extending beyond the tube a substantial distance, greater than the vertical dimension of the tube, so as to induce an upward draft of the heated air.

16. A radiator including in combination a horizontally extending heating element comparatively small in cross section and an extended area structure applied thereto; said structure comprising corrugated plates at opposite sides forming a series of ducts for the circulation of air in paths transverse to the heating element, the inner portions of the corrugations being recessed at points in horizontal alignment to fit the contour of the heating element, said plates being separated from each other and being united to the opposite sides of the heating element by heat and pressure.

17. A radiator for heating and circulating air of a room including in combination a horizontally extending heating element comparatively small in cross-section and an extended area structure applied thereto; said structure comprising corrugated plates at opposite sides forming a series of vertical ducts for inducing a draft and circulating the air, the inner portions of the corrugations being recessed at separated points in horizontal alignment to fit the contour of the heating element, being separated from each other and being united to the opposite sides of the heating element by heat and pressure.

18. An extended area radiator for heating and circulating the air in a room, including in combination an elongated horizontal heating element of relatively small cross-sectional area, two correspondingly shaped heat absorbing and radiating elements conforming to and embracing said heating element and forming vertical air flues, and means for securing the opposing portions of said heat absorbing and radiating elements together at intervals in their height and in intimate heat conducting engagement with said heating element throughout the length thereof.

19. A radiator including in combination a heating element of relatively small cross-sectional area arranged in a plurality of sections approximately parallel to one another, two correspondingly shaped heat absorbing and radiating elements conforming to and embracing the several sections of said heating element and forming a plurality of air flues arranged side by side and extending continuously across all the sections of said heating element, said heat absorbing and radiating elements being secured together and in intimate heat conducting engagement with said heating element at each side of each section thereof.

20. A radiator for heating and circulating the air of a room comprising a heating element having a plurality of horizontally extending passages one above another and communicating with one another and a radiating structure comprising plates applied to the opposite sides of said heating element and corrugated to form vertical flues so as to provide an extended heating surface for the air and to induce a substantial draft of such heated air through the flues.

21. A radiator for heating and circulating the air of a room including in combination a horizontally extending heating element and an extended area structure engaging the sides thereof and forming a series of air ducts, said heating element comprising a single section of tubing and being located in the lower portions of said ducts, the ducts extending vertically above the heating element a substantial distance greater than their extension below the heating element so as to induce an upward draft of the heated air.

22. A radiator for heating and circulating the air of a room including in combination a horizontally extending heating element and an extended-area structure comprising plates applied to the opposite sides of the heating element and forming a series of vertical air ducts extending beyond said heating element, the portions of said plates beyond the heating element being spaced apart from each other.

23. A radiator for heating and circulating the air of a room including in combination a horizontally extending heating element having flat vertical sides and an extended-area structure comprising plates applied to the opposite sides of the heating element and forming a series of air ducts extending vertically beyond said heating element, the portions of said plates beyond the heating element being spaced apart from each other.

AMERICAN RADIATOR AND STANDARD SANITARY CORPORATION,
*Assignee of Thomas E. Murray, Deceased,*
By C. M. WOOLLEY,
*Chairman of the Board.*